US005622637A

United States Patent [19]
Taiana

[11] Patent Number: 5,622,637
[45] Date of Patent: Apr. 22, 1997

[54] PROCESS FOR SEAM WELDING AN OVERLAPPING SHEET-METAL SEAM

[75] Inventor: Peter Taiana, Staffelbach, Switzerland

[73] Assignee: Elpatronic AG, Zug, Switzerland

[21] Appl. No.: 443,590

[22] Filed: May 17, 1995

[30] Foreign Application Priority Data

Jun. 3, 1994 [CH] Switzerland .............. 1750/94

[51] Int. Cl.$^6$ .................................................. B23K 11/06
[52] U.S. Cl. .................. 219/64; 219/67; 219/83
[58] Field of Search .................... 219/64, 67, 81, 219/82, 83, 86.32

[56] References Cited

U.S. PATENT DOCUMENTS

| 32,251 | 9/1986 | Matsuno et al. | 219/64 |
| 2,892,068 | 6/1959 | Park et al. | 219/86.32 |
| 3,305,662 | 2/1967 | Praeg | 219/86.32 |
| 3,591,756 | 7/1971 | Timko | 219/64 |
| 3,632,949 | 1/1972 | Thorne | 219/64 |
| 4,376,884 | 3/1983 | Gold et al. | 219/64 |
| 4,389,556 | 6/1983 | Nozawa et al. | 219/64 |

FOREIGN PATENT DOCUMENTS

| 59-85382 | 5/1984 | Japan | 219/64 |
| 660989 | 12/1978 | Switzerland . | |

OTHER PUBLICATIONS

Abstract SU–A01 815 069 (Gulyaev I V).

Primary Examiner—Teresa J. Walberg
Assistant Examiner—J. Pelham
Attorney, Agent, or Firm—McCormick, Paulding & Huber

[57] ABSTRACT

In a seam welding process for overlapping sheets, in particular for welding can bodies, the welding force is momentarily reduced upon each insertion of a can body between the welding rollers. This keeps the welding pressure constant even at the start of a can body. In this way the power input to the sheet can be kept constant even at the start of a can body, and the weld quality even at the start of a can body satisfies requirements.

11 Claims, 4 Drawing Sheets

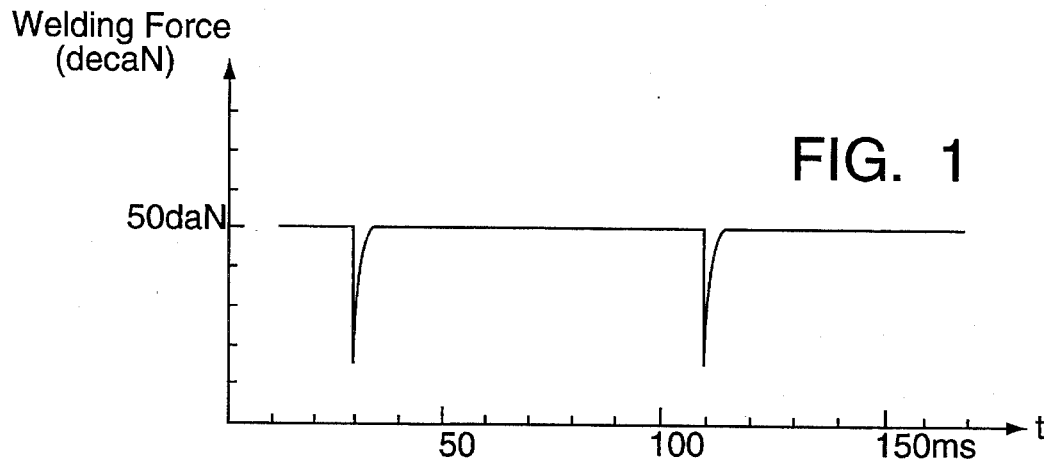
FIG. 1
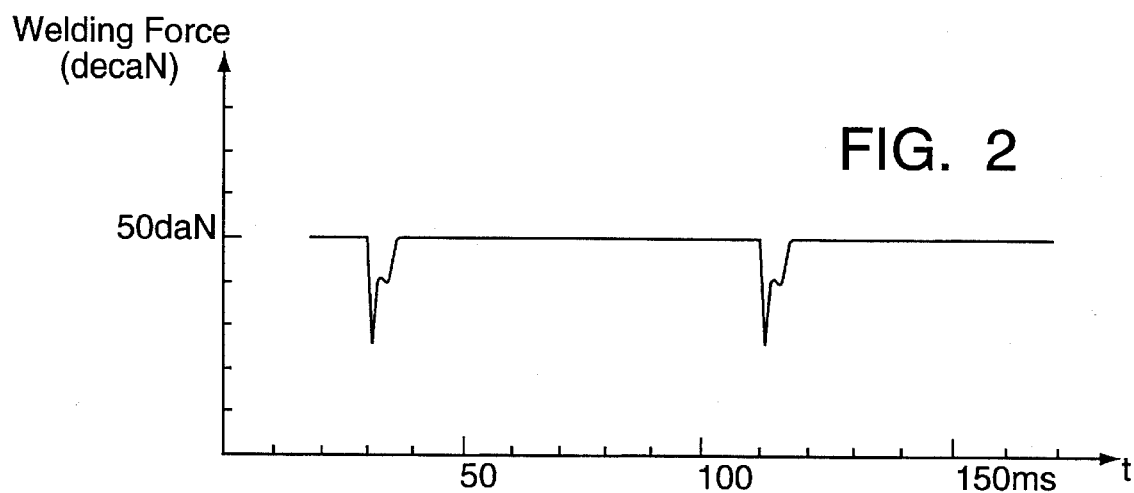
FIG. 2
FIG. 7A
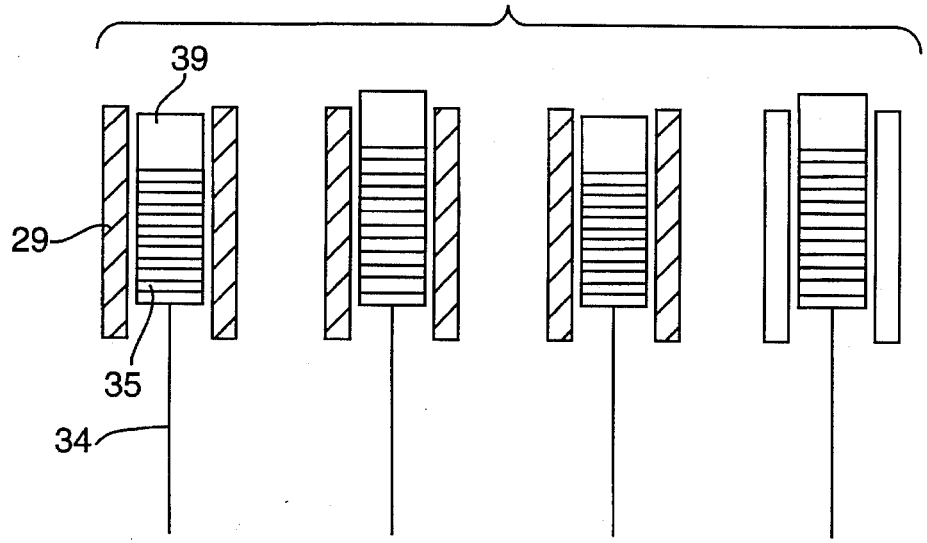

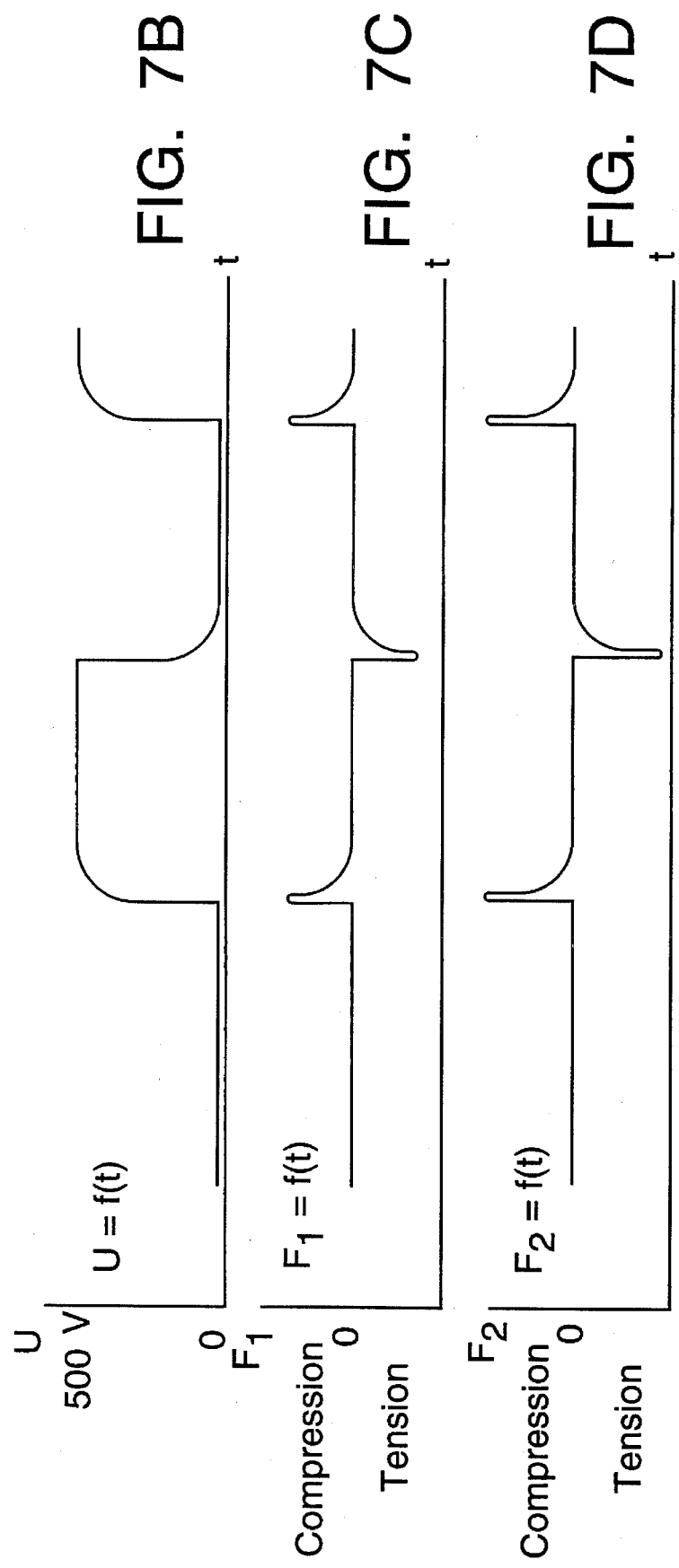

PROCESS FOR SEAM WELDING AN OVERLAPPING SHEET-METAL SEAM

BACKGROUND OF THE INVENTION

The invention relates to a process for seam welding an overlapping sheet-metal seam with a predetermined welding pressure. The invention also relates to a resistance seam welding machine for carrying out the process.

It is known that when a sheet-metal seam is welded by the roller seam welding process the initial weld spot is often incompletely welded. This is particularly disadvantageous in the production of can bodies, as the affected body has to be removed from the production line.

The problem of the initially unwelded or poorly welded seam has a number of causes. First of all, the leading end of the can does not benefit from any transfer of heat from a length of seam which has already been welded, and second, the insertion of the can body between the two roller electrodes, which forces these electrodes apart, causes a force to be exerted on the seam which is additional to the welding force which has been set, owing to the inertia of the electrodes. Furthermore, excessive welding pressure is applied at the edge of the can body, as, with welding force constant, less surface area is acted on than along the seam.

The increased welding force and/or increased welding pressure at the start causes a marked reduction in the electrical resistance in the sheet between the roller electrodes. Since the welding current is constant, the power input to the weld seam at the start of the can body changes in proportion to the said reduction in resistance. The measure adopted hitherto to counteract this has been to increase the welding current at the commencement of welding. The power input P to the sheet-metal is equal to the square of the welding current multiplied by the sheet resistance. Hence the reduction in sheet resistance at the commencement of welding can be compensated by a corresponding boost in current. However, the number of can bodies welded per minute is continually being increased. The can bodies are being fed into the welding plane more and more rapidly, and ever-increasing peak forces are occurring which in many cases can no longer be satisfactorily compensated by increasing the current.

A further problem is mechanical vibration of the welding electrodes which is set off by the peak forces at the starting edge of a can body. Efforts have been made to keep this vibration as small as possible by reducing the mass of one of the electrodes.

SUMMARY OF THE INVENTION

An object of the invention is to provide a roller seam welding process in which these problems at the commencement of welding do not occur, or are significantly reduced, so that the welded seam has the required properties from the start.

This object is attained in a roller seam welding process of the above-mentioned kind by reducing the welding force for the commencement of welding.

Decreasing the welding force at the start of welding can reduce to a harmless level the amount of change in the electrical resistance in the sheet whilst at the same time reducing mechanical vibration.

In a particularly preferred way of carrying out the invention, the welding force is also increased for a brief period at the end of the weld.

A further basic object of the invention is to provide a resistance seam welding machine for carrying out the process. This is accomplished by a device for reducing the welding force acting on the welding rollers for a period of time, which is short in relation to the overall welding time.

From the document CH-A 660989, it is known that the welding pressure can periodically be raised and lowered throughout the entire welding procedure to simulate the effect of modulating the welding current. The problem of insufficient power input at the start of welding is not dealt with in this document. In the present invention, on the other hand, the welding pressure is kept constant as nearly as possible, and this is achieved by a brief reduction in welding force at the commencement of welding.

BRIEF DESCRIPTION OF THE DRAWINGS

The invention will now be explained in detail with reference to the drawings, in which:

FIG. 1 shows the ideal characteristic curve of welding force as a function of time;

FIG. 2 shows the curve of welding force as a function of time as obtained with a device according to the invention;

FIG. 7 is a diagram illustrating a cascade of piezo-elements according to the invention, and FIGS. 7B, 7C, and 7D are graphs illustrating the reduction in welding force with the arrangement according to FIG. 5.

DESCRIPTION OF THE PREFERRED EMBODIMENTS

FIG. 1 shows the welding force at the welding rollers of a roller seam welding machine as a function of time. The diagram assumes that bodies for cans are being welded at a rate of 750 bodies per minute. This means that a time of 80 ms is available for each body. At the start of each welding phase, that is when the can body is inserted between the welding rollers, the welding force is ideally abruptly reduced as indicated by the vertical drop in the welding force curve every 80 ms. Here the welding force is reduced, eg. from the specified level of 50 daN to 15 daN. At the start of the can body, when the body is inserted, this reduction in the welding force results in a welding pressure which approximately corresponds to the welding pressure required, and hence to the welding pressure which is effective for the rest of the weld with a welding force of 50 daN. In the illustrated example, the reduction in welding force is effective for approximately 4% of the height of the can body, or during the first 4% of the weld time. A preferred range is between 2% and 15% of the weld time. After the maximum fall in welding force, the welding force ideally climbs again, not abruptly, but continuously, as shown in FIG. 1.

The reduction in welding force may, of course, occur over a somewhat longer or shorter period of time than that shown. This will depend on the type and thickness of the sheets to be welded and—in respect of the electrode vibration to be avoided—on the mass of electrodes. The extent of the drop in welding force can, of course, be selected over a wide range. The drop in welding force at the commencement of welding is preferably made sufficiently large to remove the need for a boost in current altogether, ie. there is practically no reduction in resistance at the edge of the can body, or upon insertion of the can body, due to the drop in welding force or welding pressure.

The momentary drop in welding force can of course be brought about in many ways. The reduction in force is preferably obtained by a hammer which is controlled by the welding cycle timer to act momentarily on the support for the welding electrode so that the welding force at the latter is reduced by the hammer blow. The hammer is preferably actuated by a magnetic coil. FIG. 2 shows the welding force as a function of time for a device of such a construction with an electromagnetically actuated hammer. The number of can bodies per minute is the same as for the ideal characteristic curve in FIG. 1: a rapid drop in welding force again occurs every 80 ms. In this case, the welding force is reduced to about half. After the rapid drop in welding force, there is a somewhat more gradual climb to the required level of welding force, which yields the required welding pressure along the remaining part of the seam.

Figure 3:
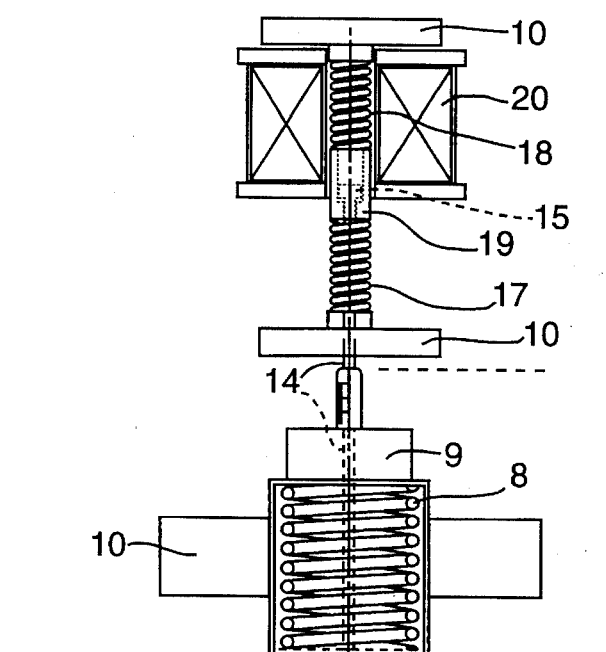
FIG. 3 is a schematic illustration of the welding force adjuster on a roller seam welding machine.

FIG. 3 shows in schematic form a welding force adjuster on a seam welding machine for can bodies. On this machine the individual can body 1 is advanced along a guide 2 to the welding rollers. A lower welding roller 3 is provided on an arm 6, and an upper welding roller 4 is provided on an arm or movable rocker 7. Welding is performed by means of an electrode wire 5. Such a device is known. The welding force is adjusted, likewise in a known manner, by means of a welding force spring 8 attached to the machine frame 10. This welding force spring 8 acts via the rod 11 on the rocker 7 and hence on the upper welding roller 4. The welding force can be set to a predetermined value by varying the initial compression of the welding force spring 8 by means of an adjuster 9.

Figure 4:
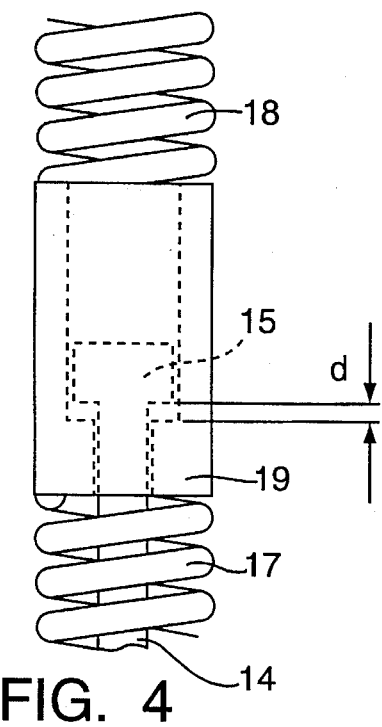
FIG. 4 shows a part of the welding force adjuster in FIG. 3.

The device illustrated is also provided with an arrangement for periodic reduction of the welding force. This acts via a connecting pin 14 on the rod 11 and hence on the rocker 7 and the welding roller 4. The connecting pin 14 extends upwards through a part of the machine frame 10 and is widened at its opposite end to the welding force spring 8 into a connecting pin head 15. This can be seen in more detail in FIG. 4, in which the upper end of the connecting pin 14 is illustrated on a larger scale. At its upper end 14, the connecting pin is surrounded by a hammer 19 which is held between two compression springs 17 and 18 on the machine frame 10. A part of the hammer 19 and the upper compression spring 17 are surrounded by a magnetic coil 20.

To reduce the welding force at the start of the can body, the magnetic coil 20 is activated and deactivated under the control of the welding cycle timing. When, upon activation, a current is passed through the magnetic coil 20 the compression spring 18 is shortened in the magnetic field which is created, and the hammer 19 is moved upwards into the interior of the magnetic coil 20. The hammer, being magnetizable, is also pulled upwards into the interior of the coil. This is characteristic produces the early part of the curve shown in FIG. 2. The hammer accelerates over the distance d (FIG. 4) and then strikes the head 15 of the connecting pin 14 to exert on the connecting pin 14 a force which is directed upwards in the drawing and which counteracts the force exerted by the welding force spring 8 on the welding roller 4. Thus the effective force at the start of welding the can body is reduced by the blow of the hammer 19 on the connecting pin head 15, eg. to less than half that required subsequently to produce the set welding pressure. Upon the ensuing deactivation of the magnetic coil 20, the magnetic field decays relatively slowly, causing the spring within the magnetic field to relax and the normal welding force, determined by the welding force spring 8 only, to be restored.

With this device, it is possible to influence the amplitude of the force-peak by the mass of the hammer and by the field strength of the coil. As already stated, the activation and deactivation of the magnetic coil 20 are synchronised with the weld cycle timing, an adjustable time function element being provided between the cycle timer and the supply circuit for the magnetic coil 20. The polarity is inverted upon each pulse to prevent permanent magnetization.

Figure 6:
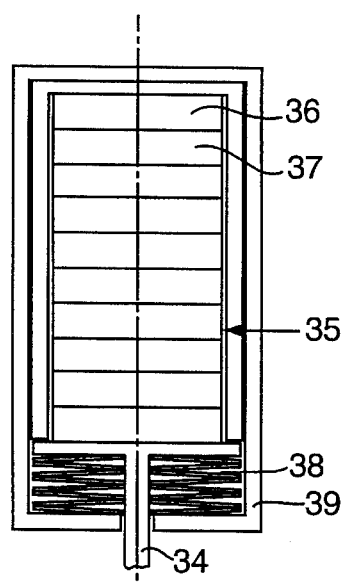
FIG. 6 shows a part of the welding force adjuster in FIG. 5.
Figure 5:
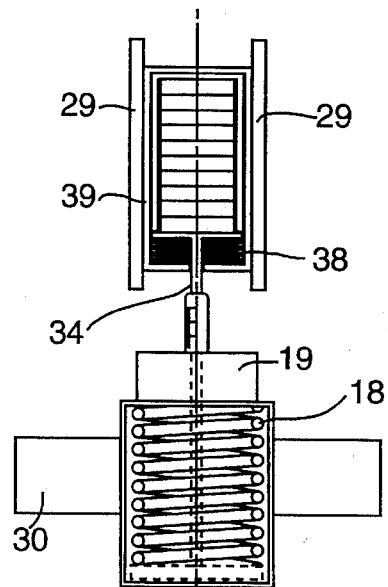
FIG. 5 is another schematic illustration of a welding force adjuster.
Figure 5:
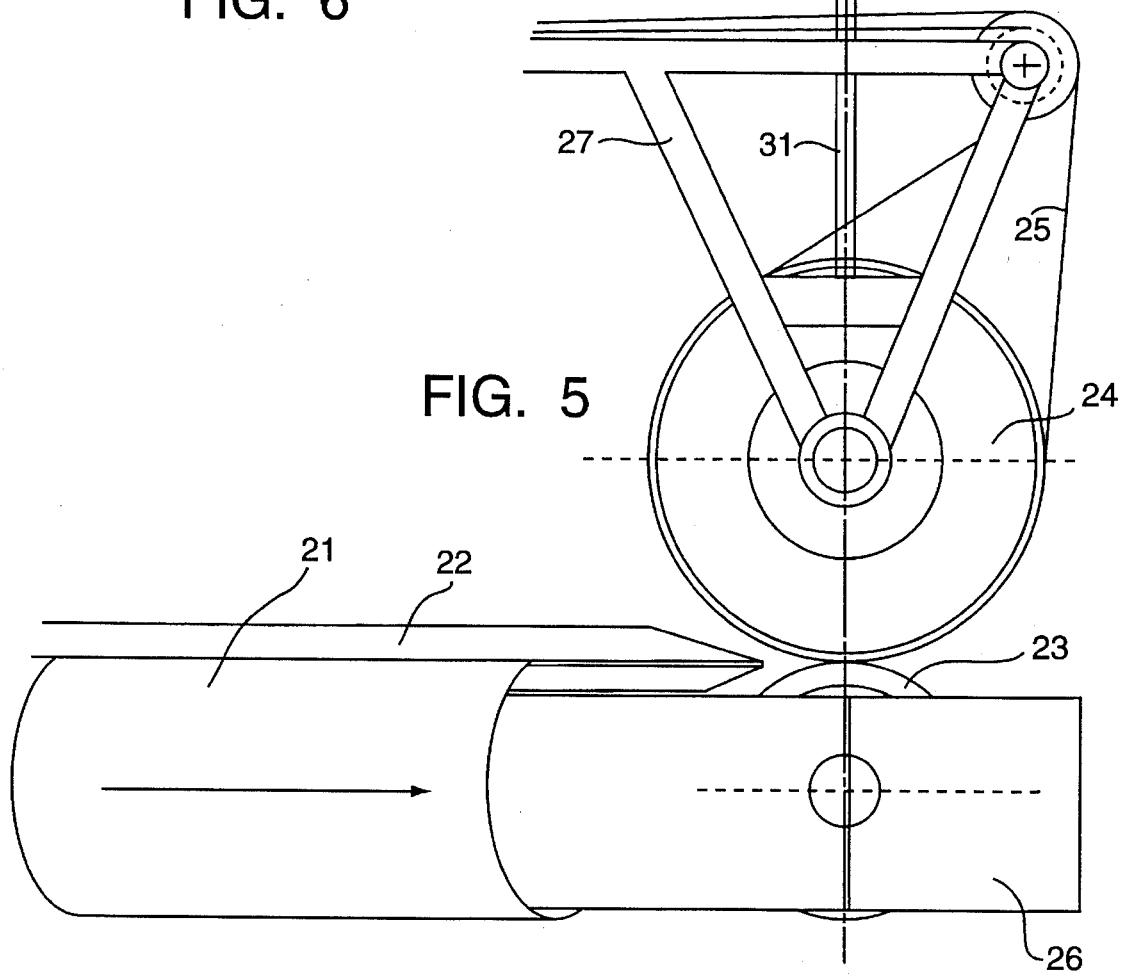

FIG. 5 shows a further configuration of the welding force adjuster. A can body 21 passes along a guide 22 to the welding rollers 23 and 24 which are arranged on arms 26 and 27 respectively. Welding is performed using the wire 25 as intermediate electrode. The welding force is normally set, as already described, by means of the welding force spring 18 which acts via the rod 31 on the upper welding roller 24. The exertion of force at the start of the can body to reduce the welding force is in this case obtained by a cascade 35 of individual piezo-elements, illustrated in FIG. 6 on an enlarged scale. This cascade is arranged in a casing 39 which is mounted in a guide 29 so as to be freely movable vertically. Through a connecting pin 34, this cascade acts directly via the rod 31 on the upper welding roller 24. The individual piezo-elements, of which there are ten in the illustrated example, two being designated 36 and 37, are kept under load by disc springs to prevent disruptive tension stresses from occurring. When a voltage is applied to the cascade of piezo-crystal elements, the thickness of each element is reduced by a certain amount, and the length of the entire cascade is reduced by ten times that amount.

The stack of piezo-elements in its protective sleeve sits on the connecting pin 34. It is surrounded by a casing 39 which on the one hand serves to transmit the force of the disc springs ad on the other hand serves as a weight which is displaced by the expansion of the piezo-cascade (by exploiting the inertia). This displacement of the casing generates a force. As it is released by the cascade, which sits on the connecting pin, an opposing force is produced at that point.

The casing 39 is therefore displaced upwards by the expansion of the piezo-cascade. Meanwhile the cascade is pushed down on the connecting pin plate 34 which transmits a positive force via the rod 31 to the welding roller 24 (increasing the welding force).

This operation takes place before the first can body is inserted. When the start of the can body is pushed between the welding rollers, the voltage is reset (discharging the cascade).

This produces a reversal of the process described above, that is to say, the piezo-elements contract, and the load in the disc springs pulls the casing back in the opposite direction. A negative force is exerted on the connecting pin and the welding force is reduced.

The force curve can be modified by varying the amplitude and ramp form of the voltage.

FIG. 7A shows schematically the mode of operation of the piezo-cascade 35, the casing 39 being represented merely as a weight. The graphs of FIGS. 7B, 7C and 7D show the voltage applied to the cascade and the forces $F_1$ and $F_2$. $F_1$ is the force with which the weight (casing) is displaced. $F_2$ is the force with which the piezo-cascade, including the weight, is displaced. $F_1$ is always smaller than $F_2$. $F_2$ is the force acting on the welding roller.

In addition, the force of the welding force spring continues to act independently on the welding roller.

Both of the embodiments described as examples have the feature of not being susceptible to variations in tolerances (such as variations in sheet thickness, eccentricity of welding rollers, thermal expansion of machine components, etc.).

In the case of the electromagnetic design, such variations in tolerances can be absorbed in the distance "d".

In the case of the piezo-electric design, the entire piezo-cascade is freely mounted on the connecting pin 34, so that the cascade is able to move freely up or down in a vertical mounting in response to variations in tolerances.

According to a further aspect of the invention, the welding force can be increased at the end of a can body or series of can bodies. The increase in force at the end of a can body or series of can bodies is functionally equivalent to a reduction in welding current, and prevents overheating of the seam at the end of the body. By suitable modification of the force-reducing device, the increase in force may also be performed by this device; or an additional device may act on one of the welding rollers or on the arm or rocker.

Furthermore, by rapidly reducing or increasing the welding force, an active countermeasure against vibration can be taken by preventing the excitation of vibrations.

Other arrangements, not illustrated, for momentarily increasing and/or reducing the welding force, eg. pneumatic or hydraulic arrangements, can of course also be used.

I claim:

1. Process for seam welding a series of overlapping metal seams of can bodies with predetermined welding pressure, comprising the steps of:

feeding and welding a series of can bodies with overlapping metal seams between welding rollers;

exerting a welding force through the welding rollers on the overlapping metal seam at a predetermined level during the welding of each can body;

momentarily reducing the welding force exerted by the rollers on the overlapping seam below the predetermined level at the commencement of welding of at least the first in the series of can bodies; and thereafter increasing the welding force exerted by the rollers on the seam of the can body back to the predetermined level.

2. Process according to claim 1, wherein during the step of momentarily reducing the welding force undergoes a rapid fall from the predetermined level, and during the step of increasing the welding force increases at a rate which is more gradual than the fall.

3. Process according to claim 1, wherein during the step of momentarily reducing the welding force is reduced to less than half the predetermined level.

4. Process according to claim 1, wherein during the step of momentarily reducing the reduction in welding force occurs during the first 2 to 15% of the overlapping metal seam for the first can body.

5. Process according to claim 1, further comprising the step of:

momentarily increasing the welding force exerted by the rollers on the overlapping seam above the predetermined level at the end of welding of at least the last in the series of can bodies.

6. Process according to claim 5, wherein during the step of momentarily increasing the welding force is momentarily increased above the predetermined level at the end of welding of the overlapping metal seam of each can body.

7. Resistance seam welding machine for seam welding a series of overlapping sheet metal seams with a predetermined welding pressure, comprising:

welding rollers for feeding and welding the overlapping metal seams between the rollers;

means for exerting a predetermined welding force on the seams through the rollers during welding; and means for reducing the predetermined welding force exerted by the welding rollers on the seams at the commencement of welding of at least the first of the overlapping metal seams in the series for a period of time which is short in relation to the overall weld time of one of the overlapping sheet metal seams.

8. Resistance seam welding machine according to claim 7, wherein the means for reducing has a repeatably operable percussive element for producing blows which exert a force opposing the predetermined welding force.

9. Resistance seam welding machine according to claim 7, further comprising:

means for momentarily increasing the welding force by a percussive element for producing blows which exert a force supplementing the predetermined welding force.

10. Resistance seam welding machine for seam welding an overlapping sheet metal seam with a predetermined welding pressure, comprising:

welding rollers for feeding and welding the metal seams passing between the rollers, the rollers exerting a predetermined pressure on the seams during welding; and means for reducing the welding force acting on the welding rollers for a period which is short in relation to the overall weld time, the means for reducing having a repeatably operable percussive element for producing blows which exert a force opposing the weld force of at least one welding roller.

11. Resistance seam welding machine for seam welding an overlapping sheet metal seam with a predetermined welding pressure, comprising:

welding rollers for feeding and welding the metal seams passing between the rollers, the rollers exerting a predetermined pressure on the seams during welding; and means for momentarily increasing the welding force by a percussive element for producing blows which exert a force supplementing the welding force of at least one welding roller.

* * * * *